(12) United States Patent
Cosgrove

(10) Patent No.: US 8,551,206 B2
(45) Date of Patent: Oct. 8, 2013

(54) SYSTEM AND METHOD FOR SECURING GAS TURBINE AIR FILTERS

(75) Inventor: Ronald Charles Cosgrove, Four Marks (GB)

(73) Assignee: General Electric Company, Schenectady, NY (US)

(*) Notice: Subject to any disclaimer, the term of this patent is extended or adjusted under 35 U.S.C. 154(b) by 251 days.

(21) Appl. No.: 13/110,231

(22) Filed: May 18, 2011

(65) Prior Publication Data

US 2012/0291409 A1 Nov. 22, 2012

(51) Int. Cl.
*B01D 39/00* (2006.01)

(52) U.S. Cl.
USPC .......... 55/493; 55/480; 55/484; 55/501; 55/506; 55/507

(58) Field of Classification Search
USPC .......... 55/480–481, 483–484, 492–493, 55/501–502, 506–507, DIG. 31; 74/567; 312/296
See application file for complete search history.

(56) References Cited

U.S. PATENT DOCUMENTS

| | | | |
|---|---|---|---|
| 3,529,889 A * | 9/1970 | De Mey, II | 359/889 |
| 4,217,122 A | 8/1980 | Shuler | |
| 4,512,789 A | 4/1985 | Pettit et al. | |
| 4,597,783 A | 7/1986 | Brennecke et al. | |
| 4,767,427 A | 8/1988 | Barabas et al. | |
| 5,961,696 A | 10/1999 | Gombos | |
| 7,540,073 B1 | 6/2009 | Gilstrap | |
| 2007/0199289 A1 | 8/2007 | Bland, Jr. et al. | |
| 2010/0071323 A1 | 3/2010 | Cosgrove | |
| 2010/0192528 A1 | 8/2010 | Mann et al. | |
| 2010/0229514 A1 | 9/2010 | Ayshford et al. | |
| 2010/0251678 A1 | 10/2010 | Mann et al. | |
| 2012/0060454 A1* | 3/2012 | Banks et al. | 55/493 |

FOREIGN PATENT DOCUMENTS

| | | |
|---|---|---|
| EP | 2 166 213 A2 | 3/2010 |
| EP | 2 218 490 A1 | 8/2010 |
| WO | 2007/106002 A1 | 9/2007 |

OTHER PUBLICATIONS

Search Report issued in connection with GB Application No. 1208666.6, Sep. 18, 2012.

* cited by examiner

*Primary Examiner* — Robert Clemente
*Assistant Examiner* — Karla Hawkins
(74) *Attorney, Agent, or Firm* — Dority & Manning, PA

(57) ABSTRACT

A gas turbine air filter system includes a frame and at least one guide attached to the frame. A first lever is attached to the frame and can pivot with respect to the frame to engage a first filter. A second lever is attached to the frame and can pivot with respect to the frame to engage a second filter. A method for securing gas turbine air filters includes inserting a first filter into a frame inside at least one guide and pivoting a first clamp connected to the frame to engage at least a portion of the first clamp with the first filter. The method further includes inserting a second filter into the frame inside the at least one guide and pivoting a second clamp to engage at least a portion of the second clamp with the second filter.

19 Claims, 6 Drawing Sheets

SYSTEM AND METHOD FOR SECURING GAS TURBINE AIR FILTERS

FIELD OF THE INVENTION

The present invention generally involves a system and method for securing gas turbine air filters.

BACKGROUND OF THE INVENTION

Commercial and industrial equipment often require a filtered source of air or other working fluid to operate. For example, a gas turbine used for power generation often draws in a large volume of ambient air to operate, and contaminants or other fine debris in the air may adversely affect the efficiency, operation, and durability of the gas turbine. As a result, a filter system at the inlet of the gas turbine may be used to remove contaminants and other fine debris from the air being supplied to the gas turbine.

The filter system often includes one or more pre-filters followed by a final filter. The one or more pre-filters may remove the larger contaminants and debris, and the final filter may remove the smaller contaminants and debris. Gaskets, clamps, and/or bolts are often used to precisely position the filters and securely hold the filters in place to provide an airtight pathway through which the air may flow before entering the equipment. As would be expected, the filter system requires periodic maintenance to disassemble, inspect, and/or replace the various filter stages. This maintenance may often be time-consuming, requiring specialized tools and skilled operators to ensure that the replacement filters are properly installed. If the replacement filters are not properly installed, unfiltered air may bypass the filter system, resulting in reduced operating efficiency and/or increased maintenance costs.

Therefore, an improved filter system that reliably positions and securely holds the filters in place without requiring tools or skilled operators would be useful.

BRIEF DESCRIPTION OF THE INVENTION

Aspects and advantages of the invention are set forth below in the following description, or may be obvious from the description, or may be learned through practice of the invention.

One embodiment of the present invention is a gas turbine air filter system that includes a frame and at least one guide attached to the frame. A first clamp is attached to the frame and has an open position that allows a first filter to be positioned within the at least one guide and a closed position that engages at least a portion of the first clamp against the first filter. A second clamp is attached to the frame and has an open position that allows a second filter to be positioned within the guide and a closed position that engages at least a portion of the second clamp against the second filter.

Another embodiment of the present invention is a gas turbine air filter system that includes a frame and at least one guide attached to the frame. A first lever is attached to the frame and can pivot with respect to the frame to engage a first filter. A second lever is attached to the frame and can pivot with respect to the frame to engage a second filter.

Embodiments of the present invention may also include a method for securing gas turbine air filters. The method includes inserting a first filter into a frame between inside at least one guide and pivoting a first clamp connected to the frame to engage at least a portion of the first clamp with the first filter. The method further includes inserting a second filter into the frame inside the at least one guide and pivoting a second clamp to engage at least a portion of the second clamp with the second filter.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
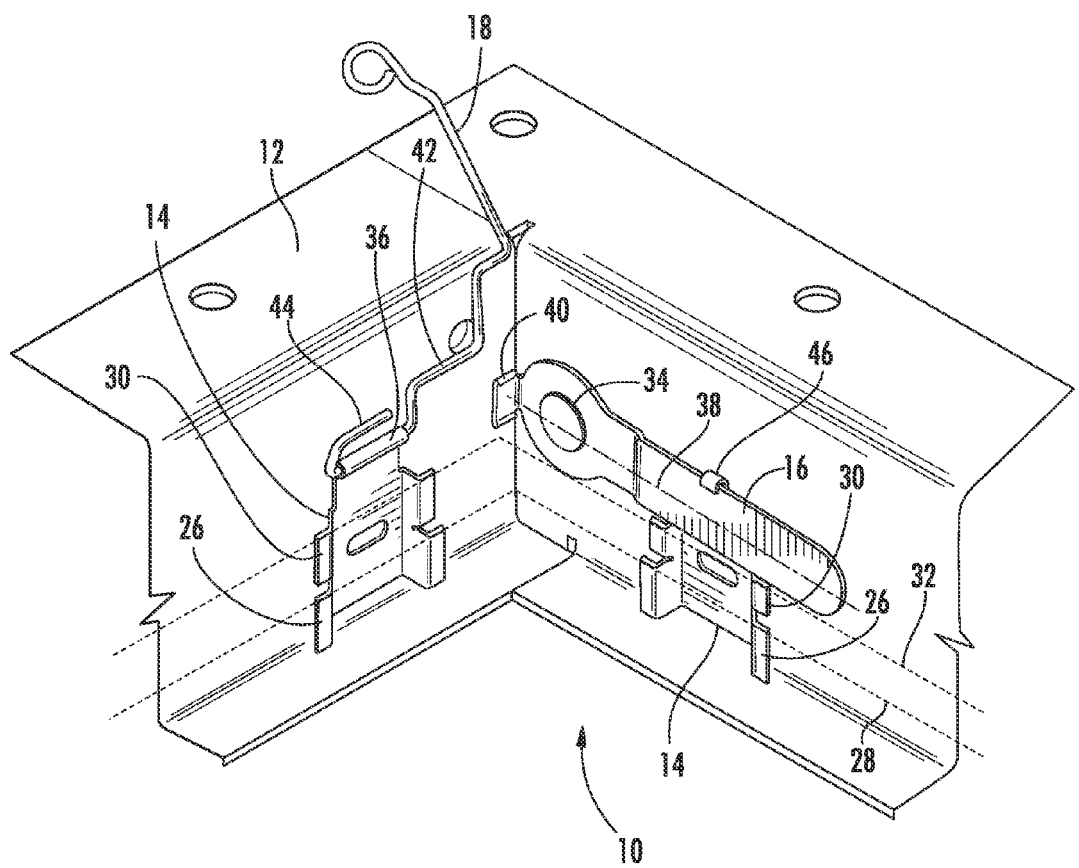
FIG. 1 is a perspective view of a gas turbine air filter system according to one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention provide systems and methods for accurately positioning and securely holding in place a plurality of filters for a gas turbine. In particular embodiments, a first or final filter may be precisely positioned between a first set of guides or brackets in a frame, and a first latch may be rotated or pivoted to hold the first or final filter securely in place. A second or pre-filter may then be precisely positioned between a second set of guides or brackets in the frame, and a second latch may be rotated or pivoted to hold the second or pre-filter securely in place.

Figure 2:
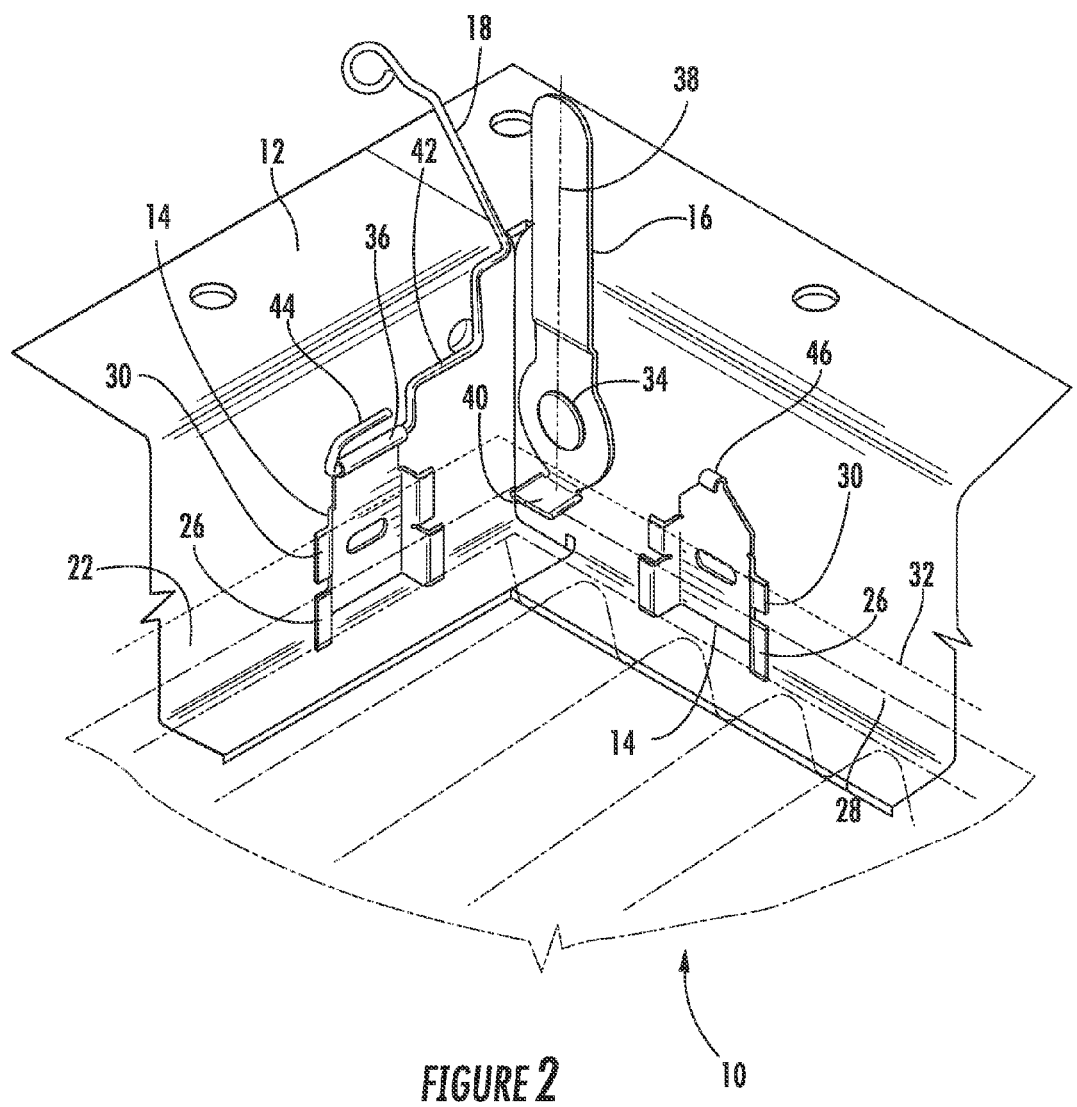
FIG. 2 is a perspective view of the system shown in FIG. 1 with one clamp closed.
Figure 3:
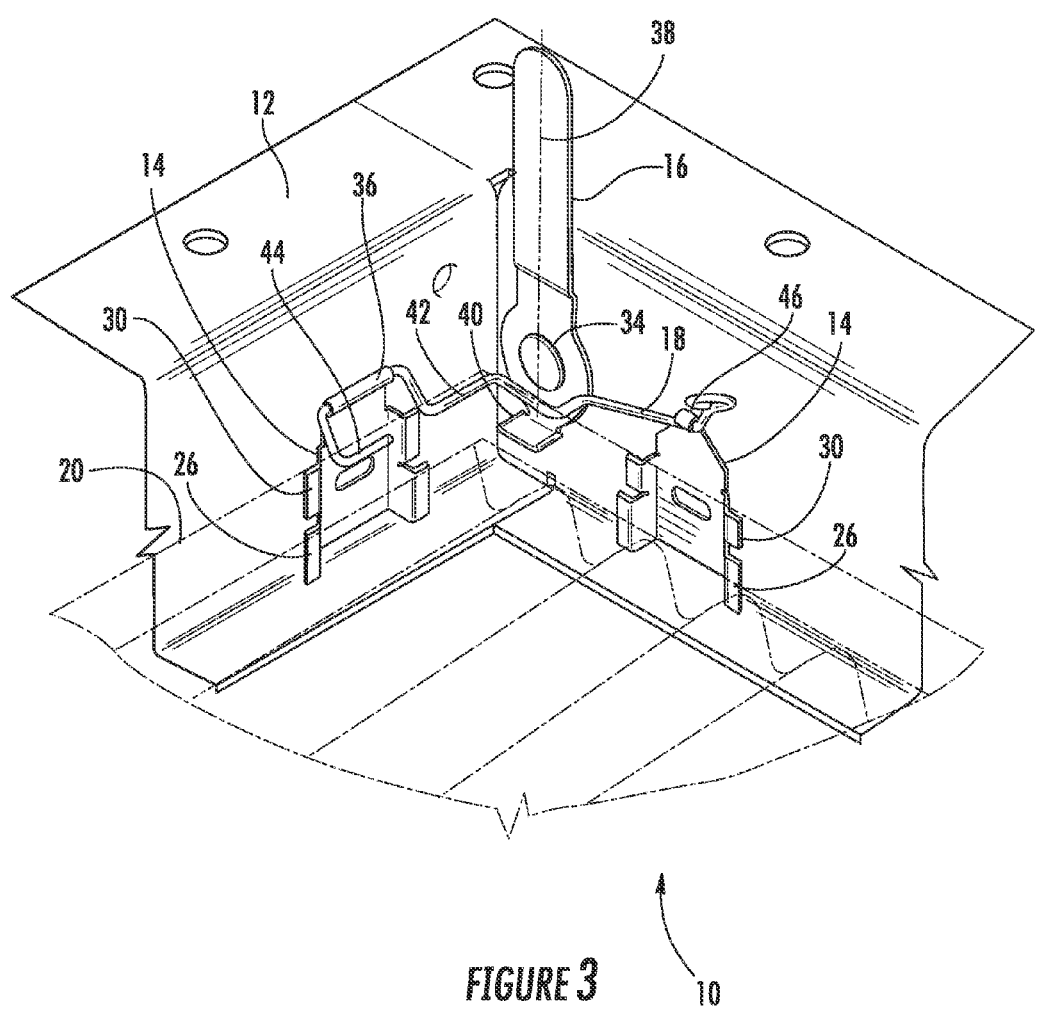
FIG. 3 is a perspective view of the system shown in FIG. 1 with both clamps closed.

FIGS. 1-3 provide perspective views of a gas turbine air filter system 10 according to one embodiment of the present invention in various operating positions. As shown, the system 10 generally comprises a frame 12, one or more guides 14, and first and second clamps, levers, or cantilevers 16, 18 configured to precisely position and securely hold a plurality of filters in place. The plurality of filters may comprise, for example, one or more pre-filters 20 designed to remove larger contaminants or debris and one or more final filters 22 designed to remove smaller contaminants or debris. As used herein, the terms first filter and second filter may be variously used to refer to either or both of the pre-filter 20 or the final filter 22 without any intention to limit or specifically associate the first or second filters with either the pre-filter 20 or the final filter 22.

The frame 12 may comprise any suitable structure for securely holding the plurality of filters 20, 22 in place. The frame 12 may be constructed from plastic, wood, metal, or other material suitable for the anticipated temperatures and pressures of the particular environment, and the size and shape of the frame 12 may be selected to provide a complementary border around all or a portion of the particular filters 20, 22 being used. For example, as shown in FIGS. 1-3, the frame 12 may comprise a square border in anticipation of receiving similarly shaped filters 20, 22. However, in particular embodiments, the frame 12 may not surround the filters 20, 22 entirely, and the frame 12 may surround only a portion of the filters 20, 22, with the remaining portion of the filters 20, 22 surrounded by ducting, plastic, sheeting, and/or a combination thereof or other suitable materials for providing a substantially airtight enclosure around the filters 20, 22.

The one or more guides 14 may be connected to the frame 12 to precisely position the filters 20, 22 in the system 10. Each guide 14 or set of guides may comprise one or more flanges or tabs that extend inward from the frame 12 a predetermined distance to define a specific perimeter associated with a particular filter size. For example, as shown in FIGS. 1-3, each guide 14 may comprise a first surface 26 that defines a first perimeter 28 inside the frame 12. Similarly, each guide 14 may comprise a second surface 30 that defines a second perimeter 32 inside the frame 12. In this manner, the first surfaces 26 may contact or engage with the first filter 22 (shown in phantom in FIG. 2) inserted between the guides 14 while not permitting a larger filter to fit inside the first perimeter 28 defined by the first surfaces 26. Similarly, the second surfaces 30 may contact or engage with the second filter 20 (shown in phantom in FIG. 3), but the second perimeter 32 defined by the second surfaces 30 is too large to allow the second surfaces 30 to contact or engage with the smaller first filter 22 (shown in phantom in FIG. 2). As a result, the one or more guides 14 may not only precisely position the first and second filters 22, 20 in the system 10, but the various perimeters 28, 32 defined by the first and second surfaces 26, 30 may also reduce the possibility that the first and second filters 22, 20 may be installed in the system 10 in an incorrect order. In other particular embodiments, the one or more guides 14 may include a slot or projection designed to receive or mate with a complementary fitting in the particular filters being used to further ensure that the first and second filters 22, 20 are installed in the correct order in the system 10.

The first and second clamps, levers, or cantilevers 16, 18 each have a first or open position to allow one or more filters to be inserted into the frame 12 and a second or closed position to securely hold the various filters in place in the frame 12. Each clamp, lever, or cantilever 16, 18 may be movably or rotatably connected to the frame 12 and/or guides 14 using a rivet, a hinge, a bolt, a swaged boss, or other device known in the art for allowing movement or rotation between two components. For example, as shown in FIG. 1, the first clamp 16 may be attached to the frame 12 and/or guide 14 using a rivet 34, and the second clamp 18 may be attached to the frame 12 and/or guide 14 using a hinge 36. The first clamp 16 may further define a longitudinal axis 38 and may comprise a tab 40 or other projection that extends substantially perpendicular to the longitudinal axis 38 and/or inwardly from the frame 12. The second clamp 18 may comprise one or more arms that extend from the hinge 36, frame 12, and/or guide 14. For example, as shown in FIGS. 1-3, the second clamp 18 may comprise a stepped arm 42 extending from one side of the hinge 36 and a cantilevered arm 44 extending from the other side of the hinge 36. As further shown in FIGS. 1-3, the stepped arm 42 may be curved or bowed between the hinge 36 and the end of the second clamp 18.

In particular embodiments, as shown in FIGS. 1-3, the system 10 may further comprise a detent 46 connected to the frame 12 and/or guides 14. The detent 46 may engage with the first and/or second clamps 16, 18 to hold the first and/or second clamps 16, 18 in particular positions during operation of the system 10. The detent 46 may comprise a latch, a projection, an indentation, or similar structure on one or more of the frame 12 and/or guides 14 that engages with the first and/or second clamp 16, 18. For example, as shown in FIG. 1, the detent 46 may comprise a hook extending from the frame 12 and/or guide 14 that engages with or locks the first clamp 16 in the first or open position. By way of further example, as shown in FIG. 3, the same detent 46, or another detent, may engage with or lock the second clamp 18 in the second or closed position.

Operation of the system 10 will now be explained with respect to FIGS. 1-3. In FIG. 1, both the first and second clamps 16, 18 are in the first or open position to allow one or more filters to be precisely positioned inside the frame 12 between the one or more guides 14. In the first or open position, the first clamp 16 has been rotated or pivoted so that the tab 40 is outside or beyond the perimeters 28, 32 defined by the first and second surfaces 26, 30, and the detent 46, if present, may engage with the first clamp 16 to lock the first clamp 16 in the open position. In the first or open position, the second clamp 18 has similarly been rotated or pivoted so that the stepped arm 42 and cantilevered arm 44 are outside or beyond the perimeters 28, 32 defined by the first and second surfaces 26, 30.

In FIG. 2, the first filter 22 (shown in phantom) has been inserted inside the frame 12 and the guides 14, and the first surfaces 26 have precisely positioned the first filter 22 between the guides 14. The first clamp 16 has also been released from the detent 46 and rotated or pivoted approximately 90 degrees to the second or closed position. In the second or closed position, the tab 40 extends inward from the frame 12 inside the first perimeter 28 defined by the first surfaces 26 of the guides 14. As a result, in the second or closed position, at least a portion of the first clamp 16, specifically the tab 40, contacts or engages with the first filter 22 to securely hold the first filter 22 in place. The second clamp 18 remains in the first or open position.

In FIG. 3, the second filter 20 (shown in phantom) has been inserted inside the frame 12 and the guides 14, and the second surfaces 30 have precisely positioned the second filter 20 between the guides 14. The second clamp 18 has also been rotated or pivoted approximately 90 degrees to the second or closed position, and the detent 46 may engage with the second clamp 18 to lock the second clamp 18 in the closed position. In the second or closed position, the stepped arm 42 and cantilevered arm 44 extend inward from the frame 12 inside the second perimeter 32 defined by the second surfaces 30 of the guides 14. As a result, in the second or closed position, at least a portion of the second clamp 18, specifically the stepped arm 42 and/or the cantilevered arm 44, contacts or engages with the second filter 20 to securely hold the second filter 20 in place. In the second or closed position, the curved or bowed portion of the stepped arm 42 and/or the cantilevered arm 44 may extend approximately 1-7 millimeters below the hinge 36 and/or detent 46 to exert additional pressure on the second filter 20 to provide a compressive seal to the second filter 20. Inasmuch as the first filter 22 (not shown for clarity) is beneath the second filter 20, the second clamp 18 in the closed position thus applies additional compression through the second filter 20 to the first filter 22 to further hold the first filter 22 securely in place and provide a compressive seal to the first filter 22.

Figure 4:
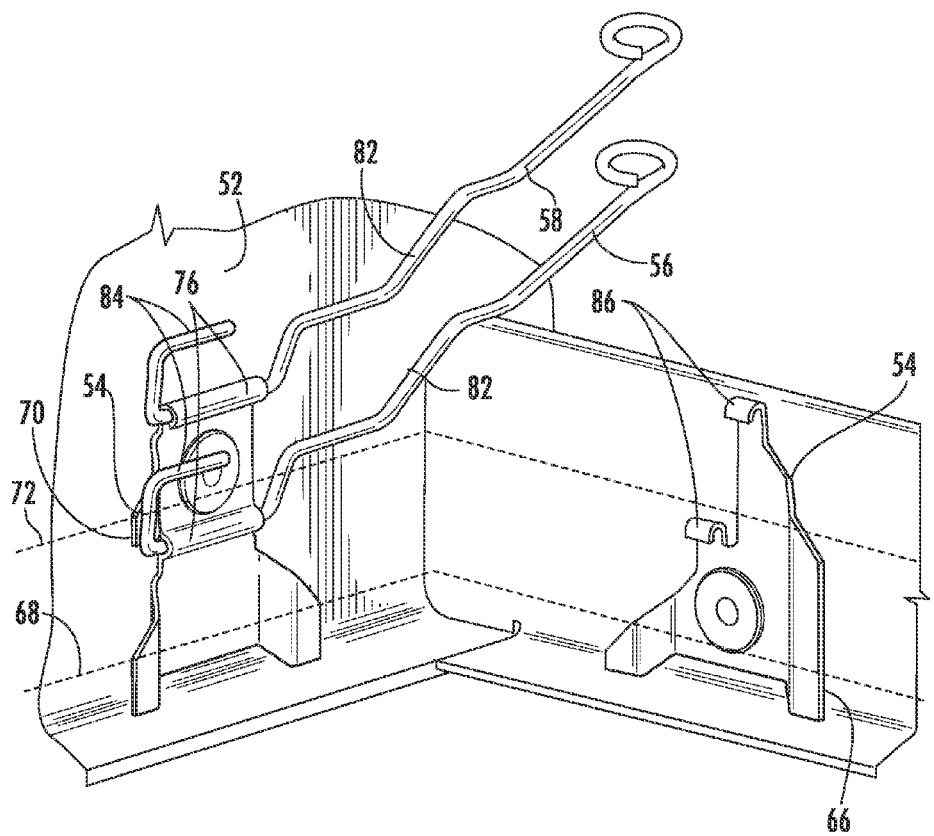
FIG. 4 is a perspective view of a gas turbine air filter system according to an alternate embodiment of the present invention.
Figure 5:
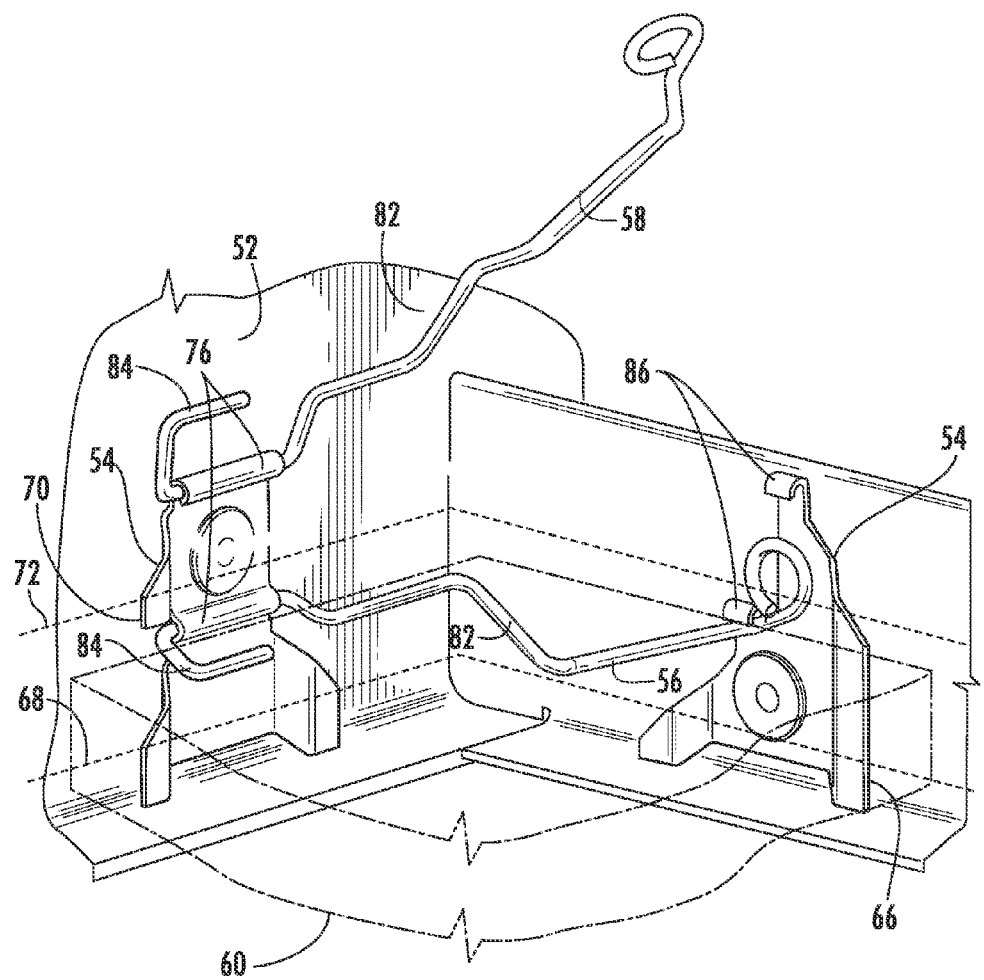
FIG. 5 is a perspective view of the system shown in FIG. 4 with one clamp closed.
Figure 6:
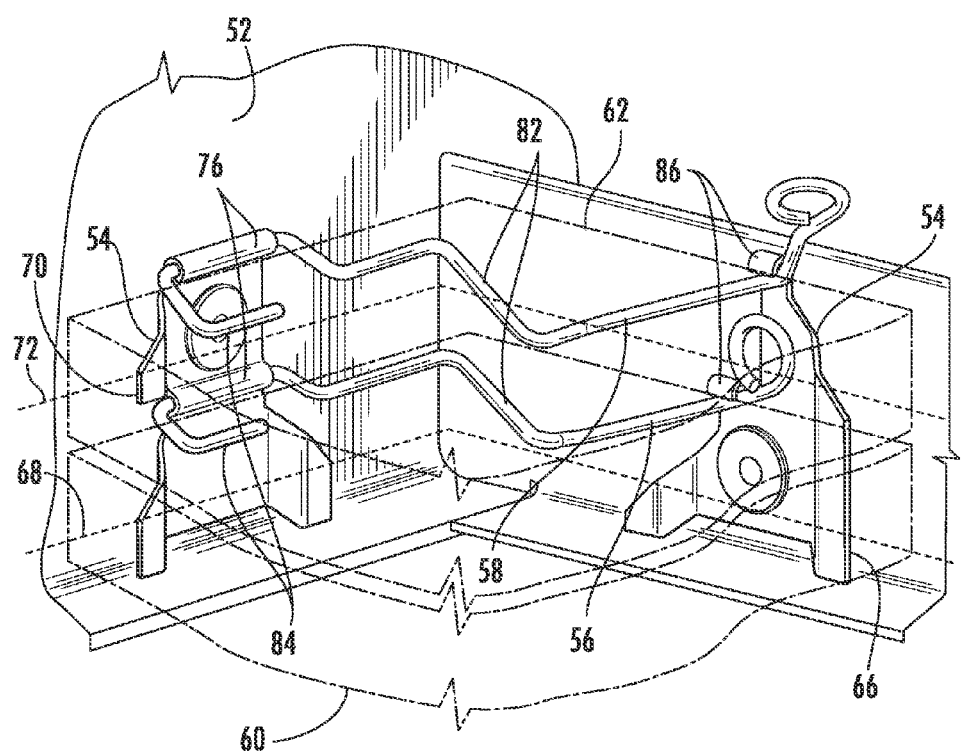
FIG. 6 is a perspective view of the system shown in FIG. 4 with both clamps closed.

FIGS. 4-6 provide perspective views of a gas turbine air filter system 50 according to an alternate embodiment of the present invention in various operating positions. As shown, the system 50 again generally comprises a frame 52, one or more guides 54, and first and second clamps, levers, or cantilevers 56, 58 configured to precisely position and securely hold a plurality of filters in place. As before, the plurality of filters may comprise, for example, one or more pre-filters 60 designed to remove larger contaminants or debris and one or more final filters 62 designed to remove smaller contaminants or debris. As used herein, the terms first filter and second filter may be variously used to refer to either or both of the pre-filter 60 or the final filter 62 without any intention to limit or specifically associate the first or second filters with either the pre-filter or the final filter.

The frame 52 may comprise any suitable structure for securely holding the plurality of filters 60, 62 in place. The frame 52 may be constructed from plastic, wood, metal, or other material suitable for the anticipated temperatures and pressures of the particular environment, and the size and shape of the frame 52 may be selected to provide a complementary border around all or a portion of the particular filters 60, 62 being used. For example, as shown in FIGS. 4-6, the frame 52 may comprise a square border in anticipation of receiving similarly shaped filters 60, 62. However, in particular embodiments, the frame 52 may not surround the filters 60, 62 entirely, and the frame 52 may surround only a portion of the filters 60, 62, with the remaining portion of the filters 60, 62 surrounded by ducting, plastic, sheeting, and/or a combination thereof or other suitable materials for providing a substantially airtight enclosure around the filters 60, 62.

The one or more guides 54 may be connected to the frame 52 to precisely position the filters 60, 62 in the system 50. Each guide 54 or set of guides may comprise one or more flanges or tabs that extend inward from the frame 52 a predetermined distance to define a specific perimeter associated with a particular filter size. For example, as shown in FIGS. 4-6, each guide 54 may comprise a first surface 66 that defines a first perimeter 68 inside the frame 52. Similarly, each guide 54 may comprise a second surface 70 that defines a second perimeter 72 inside the frame 52. In this manner, the first surfaces 66 may contact or engage with the first filter 62 (shown in phantom in FIG. 5) inserted between the one or more guides 54 while not permitting a larger filter to fit inside the first perimeter 68 defined by the first surfaces 66. Similarly, the second surfaces 70 may contact or engage with the second filter 60 (shown in phantom in FIG. 6), but the second perimeter 72 defined by the second surfaces 70 is too large to allow the second surfaces 70 to contact or engage with the smaller first filter 62 (shown in phantom in FIG. 5). As a result, the one or more guides 54 may not only precisely position the first and second filters 62, 60 in the system 50, but the various perimeters 68, 62 defined by the first and second surfaces 66, 70 may also reduce the possibility that the first and second filters 62, 60 may be installed in the system 50 in an incorrect order. In other particular embodiments, the one or more guides 54 may include a slot or projection designed to receive or mate with a complementary fitting in the particular filters being used to further ensure that the first and second filters 62, 60 are installed in the correct order in the system 50.

The first and second clamps, levers, or cantilevers 56, 58 each have a first or open position to allow one or more filters to be inserted into the frame 52 and a second or closed position to securely hold the various filters in place in the frame 52. Each clamp, lever, or cantilever 56, 58 may be movably or rotatably connected to the frame 52 and/or guides 54 using a rivet, a hinge, a bolt, a swaged boss, or other device known in the art for allowing movement or rotation between two components. For example, as shown in FIG. 4, the first and second clamps 56, 58 may be attached to the frame 52 and/or guides 54 using a hinge 76. As shown in FIGS. 4-6, the first and second clamps 56, 58 may each comprise a stepped arm 82 extending from one side of the hinge 76 and a cantilevered arm 84 extending from the other side of the hinge 76. As further shown in FIGS. 4-6, the stepped arms 82 may each be curved or bowed between the hinge 76 and the end of the respective clamps 56, 58.

In particular embodiments, as shown in FIGS. 4-6, the system 50 may further comprise one or more detents 84 connected to the frame 52 and/or guides 54. The detents 84 may engage with the first and/or second clamps 56, 58 to hold the first and/or second clamps 56, 58 in particular positions during operation of the system 50. The detents 84 may comprise a latch, a projection, an indentation, or similar structure on one or more of the frame 52 and/or guides 54 that engages with the first and/or second clamp 56, 58. For example, as shown in FIGS. 4-6, the detents 44 may comprise a hook extending from the frame 52 and/or guide 54 that engages with or locks the first and second clamps, 58 in the second or closed position.

Operation of the system 50 will now be explained with respect to FIGS. 4-6. In FIG. 4, both the first and second clamps 56, 58 are in the first or open position to allow one or more filters to be precisely positioned inside the frame 52 between the guides 54. In the first or open position, the first and second clamps 56, 58 have been rotated or pivoted so that the stepped arms 82 and cantilevered arms 84 are outside or beyond the perimeters 68, 72 defined by the first and second surfaces 66, 70.

In FIG. 5, the first filter 62 (shown in phantom) has been inserted inside the frame 52 and the guides 54, and the first surfaces 66 have precisely positioned the first filter 62 between the guides 54. The first clamp 56 has also been rotated or pivoted approximately 90 degrees to the second or closed position, and the detent 84 may engage with the first clamp 56 to lock the first clamp 56 in the closed position. In the second or closed position, the stepped arm 82 and cantilevered arm 84 extend inward from the frame 52 inside the first perimeter 68 defined by the first surfaces 66 of the guides 54. As a result, in the second or closed position, at least a portion of the first clamp 56, specifically the stepped arm 82 and cantilevered arm 84, contacts or engages with the first filter 62 to securely hold the first filter 62 in place. In the second or closed position, the curved or bowed portion of the stepped arm 82 and/or the cantilevered arm 84 may extend approximately 1-7 millimeters below the hinge 76 and/or detent 86 to exert additional pressure on the first filter 62 to provide a compressive seal to the first filter 62. The second clamp 58 remains in the first or open position.

In FIG. 6, the second filter 60 (shown in phantom) has been inserted inside the frame 52 and the guides 54, and the second surfaces 70 have precisely positioned the second filter 60 between the guides 54. The second clamp 58 has also been rotated or pivoted approximately 90 degrees to the second or closed position, and the detent 84 engages with the second clamp 58 to lock the second clamp 58 in the closed position. In the second or closed position, the stepped arm 82 and cantilevered arm 84 extend inward from the frame 52 inside the second perimeter 72 defined by the second surfaces 70 of the guides 54. As a result, in the second or closed position, at least a portion of the second clamp 58, specifically the stepped arm 82 and/or the cantilevered arm 84, contacts or engages with the second filter 60 to securely hold the second filter 60 in place. In the second or closed position, the curved or bowed portion of the stepped arm 42 and/or the cantilevered arm 44 may extend approximately 1-7 millimeters below the hinge 36 and/or detent 46 to exert additional pressure on the second filter 60 to provide a compressive seal to the second filter 60. Inasmuch as the first filter 62 (not shown for clarity) is beneath the second filter 60, the second clamp 58 in the closed position thus applies additional compression through the second filter 60 to the first filter 62 to further hold the first filter 62 securely in place and provide a compressive seal to the first filter 62.

The various embodiments described and illustrated with respect to FIGS. 1-6 enable replacement filters to be precisely positioned and securely held in the air filter systems 10, 50. Specifically, the guides ensure that the replacement filters are installed in the correct order or positions, and the systems 10, 50 do not include any loose parts that may require specialized tools to operate or that may result in debris if operated correctly. In addition, the various combinations of clamps, levers, or cantilevers provide single motion and fast acting operation that can be quickly and readily accomplished by relatively unskilled operators.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine air filter system comprising:
   a. a frame;
   b. at least one guide attached to said frame, wherein said at least one guide comprises a first surface that defines a first perimeter and a second surface that defines a second perimeter;
   c. a first clamp attached to said frame, wherein said first clamp has an open position that allows a first filter to be positioned within said at least one guide and a closed position that engages at least a portion of said first clamp against the first filter; and
   d. a second clamp attached to said frame, wherein said second clamp has an open position that allows a second filter to be positioned within said guide and a closed position that engages at least a portion of said second clamp against the second filter, and a stepped arm engaged with the second filter when said second clamp is in said closed position.

2. The gas turbine air filter system as in claim 1, wherein said first clamp comprises a tab engaged with the first filter when said first clamp is in said closed position.

3. The gas turbine air filter system as in claim 1, wherein said first clamp defines a longitudinal axis that is substantially perpendicular to said frame when said first clamp is in said closed position.

4. The gas turbine air filter system as in claim 1, wherein said second clamp comprises a stepped arm engaged with the second filter when said second clamp is in said closed position.

5. The gas turbine air filter system as in claim 4, wherein said second clamp comprises a cantilever arm engaged with the second filter when said second clamp is in said closed position.

6. The gas turbine air filter system as in claim 1, further comprising a detent that can be engaged with said second clamp when said second clamp is in said closed position.

7. The gas turbine air filter system as in claim 6, wherein said detent can be engaged with said first clamp when said first clamp is in said open position.

8. A gas turbine air filter system comprising:
   a. a frame;
   b. at least one guide attached to said frame;
   c. a first clamp attached to said frame, wherein said first clamp has an open position that allows a first filter to be positioned within said at least one guide and a closed position that engages at least a portion of said first clamp against the first filter; and
   d. a second clamp attached to said frame, wherein said second clamp has an open position that allows a second filter to be positioned within said guide, a closed position that engages at least a portion of said second clamp against the second filter, and a stepped arm engaged with the second filter when said second clamp is in said closed position.

9. The gas turbine air filter system as in claim 8, wherein said at least one guide comprises a first surface that defines a first perimeter and a second surface that defines a second perimeter.

10. The gas turbine air filter system as in claim 8, wherein said first clamp defines a longitudinal axis that is substantially perpendicular to said frame when said first clamp is in said closed position.

11. The gas turbine air filter system as in claim 8, wherein said second clamp comprises a cantilever arm engaged with the second filter when said second clamp is in said closed position.

12. The gas turbine air filter system as in claim 8, further comprising a detent that can be engaged with said second clamp when said second clamp is in said closed position.

13. The gas turbine air filter system as in claim 12, wherein said detent can be engaged with said first clamp when said first clamp is in said open position.

14. A gas turbine air filter system comprising:
   a. a frame;
   b. at least one guide attached to said frame;
   c. a first clamp attached to said frame, wherein said first clamp has an open position that allows a first filter to be positioned within said at least one guide and a closed position that engages at least a portion of said first clamp against the first filter;
   d. a second clamp attached to said frame, wherein said second clamp has an open position that allows a second filter to be positioned within said guide and a closed position that engages at least a portion of said second clamp against the second filter; and a stepped arm engaged with the second filter when said second clamp is in said closed position
   e. a detent that can be engaged with said second clamp when said second clamp is in said closed position.

15. The gas turbine air filter system as in claim 14, wherein said at least one guide comprises a first surface that defines a first perimeter and a second surface that defines a second perimeter.

16. The gas turbine air filter system as in claim 14, wherein said first clamp defines a longitudinal axis that is substantially perpendicular to said frame when said first clamp is in said closed position.

17. The gas turbine air filter system as in claim 14, wherein said second clamp comprises a stepped arm engaged with the second filter when said second clamp is in said closed position.

18. The gas turbine air filter system as in claim 17, wherein said second clamp comprises a cantilever arm engaged with the second filter when said second clamp is in said closed position.

19. The gas turbine air filter system as in claim 14, wherein said detent can be engaged with said first clamp when said first clamp is in said open position.

* * * * *